(12) United States Patent
Heineck et al.

(10) Patent No.: US 10,997,478 B2
(45) Date of Patent: May 4, 2021

(54) PRINT PROFILE ADJUSTMENTS VIA ITERATIVE SAMPLE SELECTIONS

(71) Applicant: Hewlett-Packard Development Company, L.P., Spring, TX (US)

(72) Inventors: John Michael Heineck, Boise, ID (US); David M Payne, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/637,890

(22) PCT Filed: Sep. 22, 2017

(86) PCT No.: PCT/US2017/052875
§ 371 (c)(1),
(2) Date: Feb. 10, 2020

(87) PCT Pub. No.: WO2019/059919
PCT Pub. Date: Mar. 28, 2019

(65) Prior Publication Data
US 2020/0218949 A1 Jul. 9, 2020

(51) Int. Cl.
*G06F 3/12* (2006.01)
*G06K 15/02* (2006.01)

(52) U.S. Cl.
CPC .................. *G06K 15/02* (2013.01)

(58) Field of Classification Search
CPC .. G06K 15/02; G06K 9/6201; G06K 9/00456; G06K 15/027; H04N 2201/3256; H04N 2201/326; H04N 1/00087; G06F 63/1256; G06F 63/1205; G06F 63/1208; G06F 3/1253; G06F 3/1258

USPC .............................. 358/1.14, 1.15
See application file for complete search history.

(56) References Cited

U.S. PATENT DOCUMENTS

| 4,962,421 A | 10/1990 | Murai |
| 4,979,031 A | 12/1990 | Tsuboi |
| 5,999,175 A | 12/1999 | Nalder |
| 6,055,073 A * | 4/2000 | Nomura ............... H04N 1/6033 358/504 |

(Continued)

OTHER PUBLICATIONS

Jon Langer, How to Adjust Your Printer Settings to Get Great Photos, Apr. 13, 2007, http://www.peachpit.com/articles/ ~ 9 pages.

*Primary Examiner* — Kent Yip
(74) *Attorney, Agent, or Firm* — HP Inc. Patent Department (57) ABSTRACT

An example of an apparatus including a memory to store a plurality of print profiles and sample page data. The apparatus includes a selection engine to select a first print profile and a second print profile from the plurality of print profiles. The apparatus includes a printing device to generate a first print sample in accordance with the first print profile and to generate a second print sample in accordance with the second print profile. The apparatus includes an input device to receive input to identify a preferred print sample. The apparatus includes a processor coupled to the memory and the input device, wherein the processor is to direct the selection engine to select a third print profile based on the first print profile, the second print profile, and the input to generate a third print sample for comparison with the preferred print sample.

15 Claims, 5 Drawing Sheets

(56) References Cited

U.S. PATENT DOCUMENTS

| | | |
|---|---|---|
| 7,573,596 B2 | 8/2009 | Owen |
| 8,531,692 B2 | 9/2013 | Lee et al. |
| 8,786,922 B2 | 7/2014 | Guay |
| 10,747,486 B2 * | 8/2020 | Encrenaz .............. G06F 3/1208 |
| 2005/0052668 A1 * | 3/2005 | Hoshino .............. H04N 1/6055 |
| | | 358/1.9 |
| 2006/0250628 A1 * | 11/2006 | Owen ................... G06F 3/1208 |
| | | 358/1.13 |
| 2012/0257225 A1 | 10/2012 | Fukaya |
| 2013/0003089 A1 | 1/2013 | Morovic et al. |
| 2016/0048746 A1 * | 2/2016 | Lin ........................ H04N 1/603 |
| | | 358/1.9 |

\* cited by examiner

PRINT PROFILE ADJUSTMENTS VIA ITERATIVE SAMPLE SELECTIONS

BACKGROUND

Printed documents are often used to present information. In particular, printed documents continue to be used despite the availability of electronic alternatives as they are more easily handled and read by users. Accordingly, the generation of printed documents as well as conversion of printed documents to electronic form remain important tools for the presentation and handling of information. Printers are known and have been used to generate documents. In addition, scanners are known and have been used to convert printed documents to electronic form. Due to variations between different printer and scanner designs as well as manufacturing tolerances, differences in performance between printers and scanners of the same type are known.

BRIEF DESCRIPTION OF THE DRAWINGS

Reference will now be made, by way of example only, to the accompanying drawings in which.

DETAILED DESCRIPTION

Printed documents may be widely accepted, and may often be more convenient to use. In particular, printed documents are easy to distribute, store, and be used as a medium for disseminating information. In addition, printed documents may serve as contingency for electronically stored documents, such as may happen when an electronic device fails, such as with a poor data connection for downloading the document and/or a depleted power source. When printing or scanning documents, users are generally allowed to adjust certain aspects of an image, such as brightness, contrast, background removal, and sharpness. However, users are typically unable to adjust more complicated aspects to suit specific imaging needs such as color, vibrance, etc. due to the complexity of these adjustments.

An apparatus and method are provided in which a printer or scanner is to create several versions of a document, such as a sample page. Each version of the document may be produced under different settings and/or color profiles such that a user may provide input to indicate a preferred version of the sample page. The following describes apparatus and methods directed to printing and scanning documents.

Figure 1:
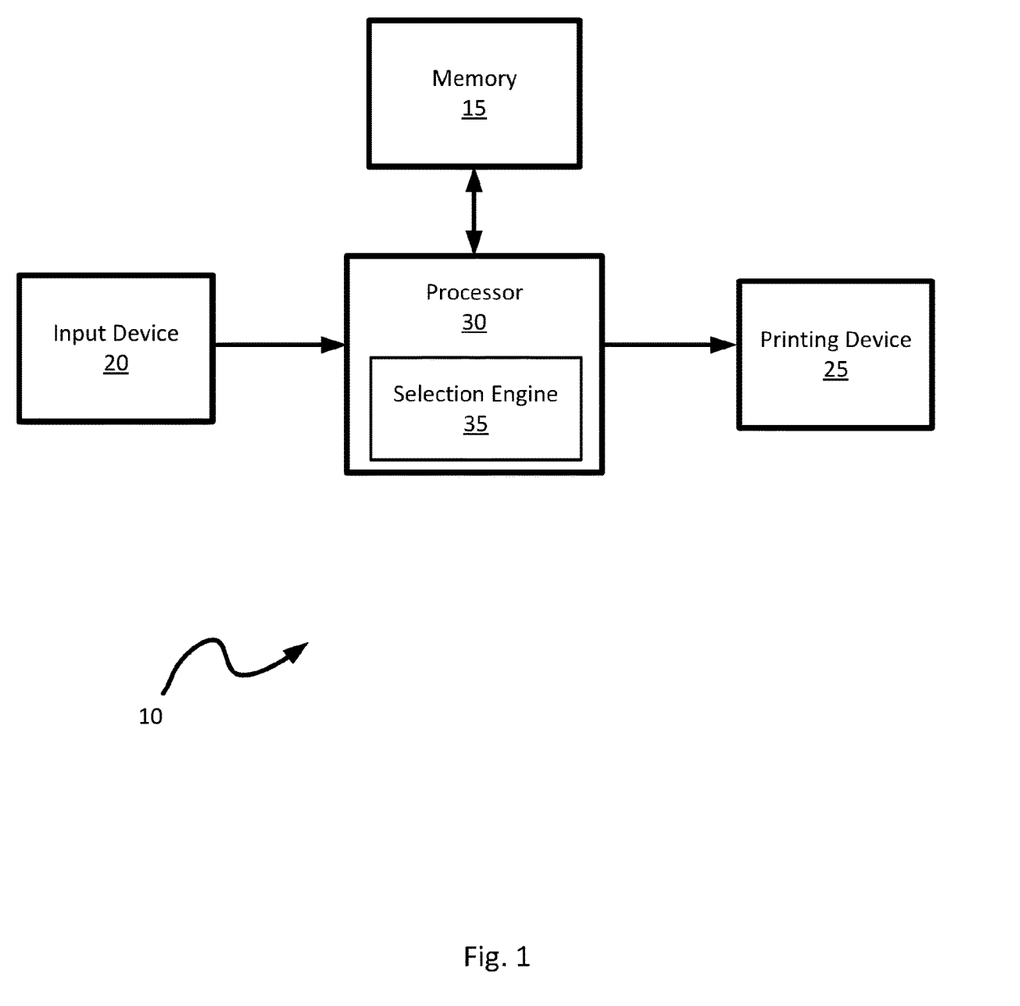
FIG. 1 is a block diagram of an example apparatus.

Referring to FIG. 1, an apparatus for printing documents is shown at 10. The apparatus 10 may include additional components, such as various additional interfaces and/or displays to interact with a user. The apparatus 10 is to determine and adjust a print profile based on input from the user. In the present example, the apparatus 10 includes a memory 15, an input device 20, a printing device 25, and a processor 30. The processor 30 may be to operate a selection engine 35 as well as carry out a set of instructions to adjust a print profile.

The memory 15 is coupled to the processor 30 and may include a non-transitory machine-readable storage medium that may be any electronic, magnetic, optical, or other physical storage device. In the present example, the memory 15 stores a plurality of print profiles in a database as well as print data. The print data may include data received for printing from another computing device (not shown) as well as data representing sample pages, such as a demonstration page to highlight the features of the printing device 25. The memory 15 may also store executable instructions. In the present example, the executable instructions may include a set of iterative instructions. For example, the memory 15 may include a set of instructions to select a first print profile and a second print profile from the database with a plurality of print profiles, a set of instructions to generate print samples in accordance with the selected print profiles, a set of instructions to receive input to identify a preferred print sample by the user, and a set of instructions to select an additional print profile based on historical data such as prior selections of a preferred print sample by the user. These instructions may repeat in a loop such that each preferred print sample identified by the user in an iteration is added to the historical data to fine tune the print settings preferred by the user.

The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions to operate the printing device 25 or other hardware to print carious documents. In addition, the machine-readable storage medium may also be encoded with data to store documents for printing, such as in a print queue.

The memory 15 may also store an operating system that is executable by the processor 30 to provide general functionality to the apparatus 10, for example, functionality to support various applications such as a user interface to access various features of the apparatus 10. Examples of operating systems include Windows™, macOS™, iOS™, Android™, Linux™, and Unix™' The memory 15 may additionally store applications that are executable by the processor 30 to provide specific functionality to the apparatus 10, such as functionality to maintain printed documents from memory, make copies of documents, or to operate various peripheral devices.

The input device 20 is to receive input to identify a preferred print sample generated by the printing device 25 as discussed in greater detail below. The input device 20 is not particularly limited and may include a keyboard, a pointer device, a touch sensitive device, a button, a microphone, or any other device to generate signals upon activation. For example, in the present example, the input device 20 is a touch screen disposed on the apparatus 10. In other examples, the input device 20 may be a communications interface to communicate with a connected device or a network, such as the Internet, where the input is received from another electronic device. For example, the apparatus 10 may be connected to a computer (not shown) via a peer-to-peer connection, such as a USB connection, which provides user input.

In the present example, the input device 20 may also provide a user interface to facilitate the collection of input from a user. The user interface may be controlled by the processor 30 and is not particularly limited. For example, continuing with the example of two print samples, the input device 20 may include a touch screen display that presents two options for a user to select with a touch of the representation of the preferred print sample on the touch screen display.

The printing device 25 is not particularly limited and may include any device capable to generate an image or document on a sheet of paper, such as a print sample or a demonstration page. The printing device 25 may generate documents under various settings and conditions. For example, the processor 30 may use print profiles to determine various settings, such as a color setting, to generate multiple versions of a document, each with a slightly different appearance.

The printing device 25 may include a print head or fluid ejection device which ejects drops of print fluid through a plurality of orifices or nozzles onto the sheet of paper. In an example, a print fluid supply may include a reservoir to store print fluid and supply printing fluid to a print head, and the processor 30 may adjust fluid flow from the reservoir to the print head based on the data associated with the image as well as a given print profile. As another example, a printing device 25 may include a print bar and the processor 30 may adjust a temperature of the print bar (or other input energy variable) to generate the image and/or document.

The processor 30 may include a central processing unit (CPU), a microcontroller, a microprocessor, a processing core, a field-programmable gate array (FPGA), or similar. The processor 30 and memory 15 may cooperate to execute various instructions. In this example, the processor 30 also maintains and operates a selection engine 35 to select print profiles. In particular, the processor 30 may execute instructions stored on the memory 15 to implement the selection engine 35. In other examples, the selection engine 35 may be substituted with an external engine, such as from a software as a service provider.

Figure 2:
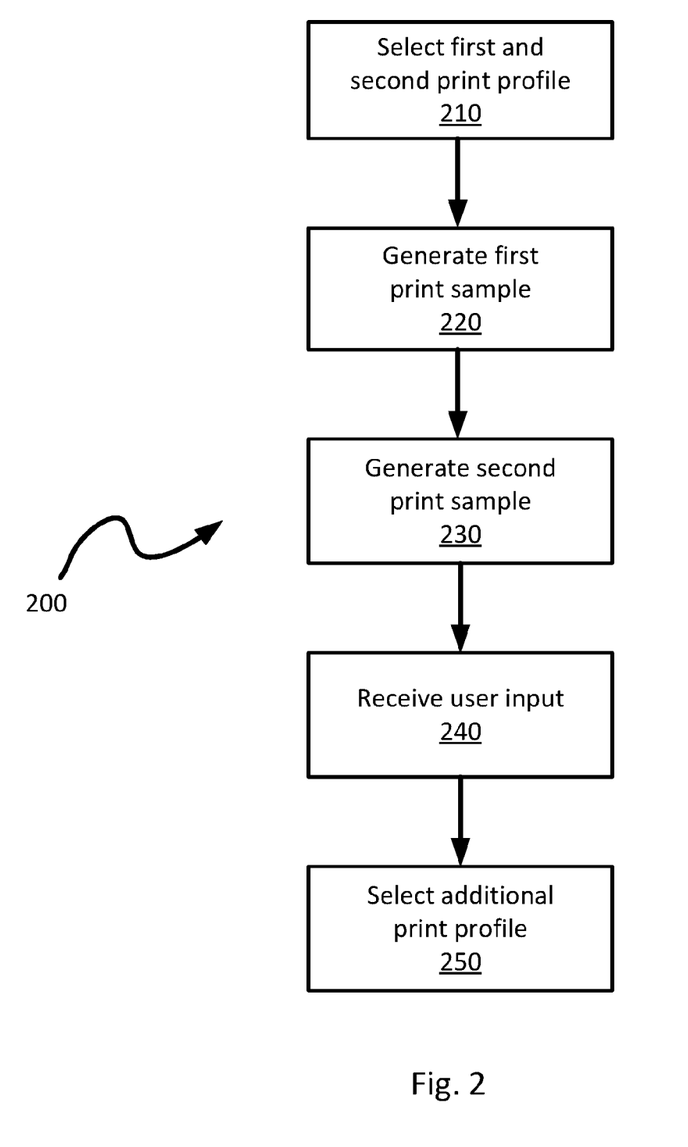
FIG. 2 is a flowchart of an example of a method.

Referring to FIG. 2, a flowchart of a method to make adjustments to a printed document is shown at 200. In order to assist in the explanation of method 200, it will be assumed that method 200 may be performed with the apparatus 10, and specifically by the processor 30. Indeed, the method 200 may be one way in which apparatus 10 may be configured. Furthermore, the following discussion of method 200 may lead to a further understanding of the processor 30, and apparatus 10 and its various components. Furthermore, it is to be emphasized, that method 200 need not be performed in the exact sequence as shown, and various blocks may be performed in parallel rather than in sequence, or in a different sequence altogether.

Beginning at block 210, the selection engine 35 selects two print profiles from the plurality of print profiles stored in the memory 15. The manner by which profiles are selected is not particularly limited. In the present example, the selection engine 35 may use historically selected print profiles from the user as a basis to select two print profiles with similar settings. The selection engine 35 may also take the images and/or documents that are to be printed into account via the detection of characteristics in the image and matching them with known print profiles based on correspondence tables. Alternatively, the selection engine 35 may select two print profiles randomly.

In the present example, print profiles are a combination of predetermined print settings stored in the memory 15 in a database. The print settings are not particularly limited and may include settings that control the colors (e.g. red, green, and blue settings), the vibrance, resolution, compression, lightness, contrast, hue, color, saturation, and dithering. It is to be appreciated that the settings are generally complex and only a narrow range of settings may produce acceptable images and/or documents. In the present example, a first print profile and a second print profile differ by a single print setting while the remaining print settings are the same. The variation of a single print setting is to be appreciated that more control may be maintained in the comparison between two print profiles. In other examples, the two selected print profiles may vary by more than one print setting to provide faster screening.

Block 220 generates a first print sample. The manner by which the first print sample is generated is not particularly limited. In the present example, the first print sample is a representation of sample page data stored in the memory 15. The sample page data may be a template stored in the memory 15, such as a demonstration page typically printed upon the startup of most printers. In some examples, multiple versions of sample page data may be stored where each version has different features. For example, one version of the sample page data may include a document with mostly text, another version with mostly photographic images, and another version with graphical representations such as charts and graphs. It is to be appreciated that the preferred print settings for each of these types sample pages may be different to achieve a higher quality print sample. In the present example, the first print sample is generated with one of the print profiles selected by the selection engine 35 from the execution of block 210.

Next, block 230 generates a second print sample. The manner by which the second print sample is generated is not particularly limited and may involve similar methods to those used to generate the first print sample described in connection with the execution of block 220. It is to be appreciated that the second print sample is generated from the same sample page data as that used to generate the first print sample. However, the generation of the second print sample is carried out with a different print profile. Continuing with the present example, a print setting, such as a color setting, may be varied to generate a print sample with a slightly different appearance than the first print sample despite using the same sample page data.

Block 240 involves the processor 30 to receive input from the input device 20 to select a preferred print sample from one of the print samples generated at block 220 or block 230. In the present example, the input is received via the input device 20 from a user, for example, via a touch screen. In other examples, the input may be received without user intervention from another device capable to perform image analysis and to assess the quality of the print samples.

At block 250, the selection engine 35 selects an additional profile from the plurality of print profiles stored in the memory 15. The manner by which the additional print profile is selected is not particularly limited. In the present example, the selection engine 35 selects and additional print profile based on the input received at block 240. For example, the additional print profile may be based on the original two print profiles selected at block 210 and the input received at block 240. For example, if the two print profiles selected at block 210 vary by a print setting, the additional print profile may be varied by another print setting. For example, if the two print profiles selected at block 210 vary by a red level setting, the additional print setting may be varied by a green level setting.

In the present example, the additional print profile may then be fed back into the method 200 at block 240 for a comparison between the selected print profile and the additional print profile. In some examples, this may be iterated as part of a process to fine tune the print profile for the sample page data and establish the preferred print profile. It is to be appreciated by those skilled in the art with the benefit of this description, that the iterative process to use historical data, such as the print profiles from block 210 as well as the input received at block 240, may be considered to be a type of psychometric testing carried out by a user. Accordingly, the processor 30 may be used as an instrument to use psychometric testing to establish the preferred print profile for sample page data used to generate the print samples.

Psychometric testing is a process where a user is presented with two print samples for comparison, where each print sample varies by at least one print setting. In some examples, the psychometric testing may vary by more than one print setting or present more than two print samples, but this would increase the complexity to determine the preferred print profile. Once a user has selected the best print sample, the processor 30 presents an additional print sample for comparison. The process may be repeated to collect data about user preferences. The data may be analyzed by the processor to establish the most preferable print profile based on the cumulative results.

The application of the method 200 to sample page data may result in the determination of a preferred print profile. Although the present example describes a method to compare two print samples at a time, it is to be appreciated that the method may involve a comparison of more than two print samples and involve the comparison of a set of print samples. Accordingly, the selection of one or more preferred print profiles by a user may be used to generate an additional set of print samples.

Furthermore, it is to be appreciated that once a preferred print profile is determined for a specific model of printer, the preferred profile may be provided to some or all printers of the same or similar model under the control of an administrator, such as at a company or department within a company having multiple printers. This method may provide substantially uniform printing. However, due to printer tolerances as well as uncontrollable factors at various locations such as humidity or ink quality, determination of the preferred print profile may still be required. In other embodiments, the preferred profile may be provided to printers of different models. In such an embodiment, a conversion process would be applied to account for differences in the default characteristics of the different models.

Figure 3:
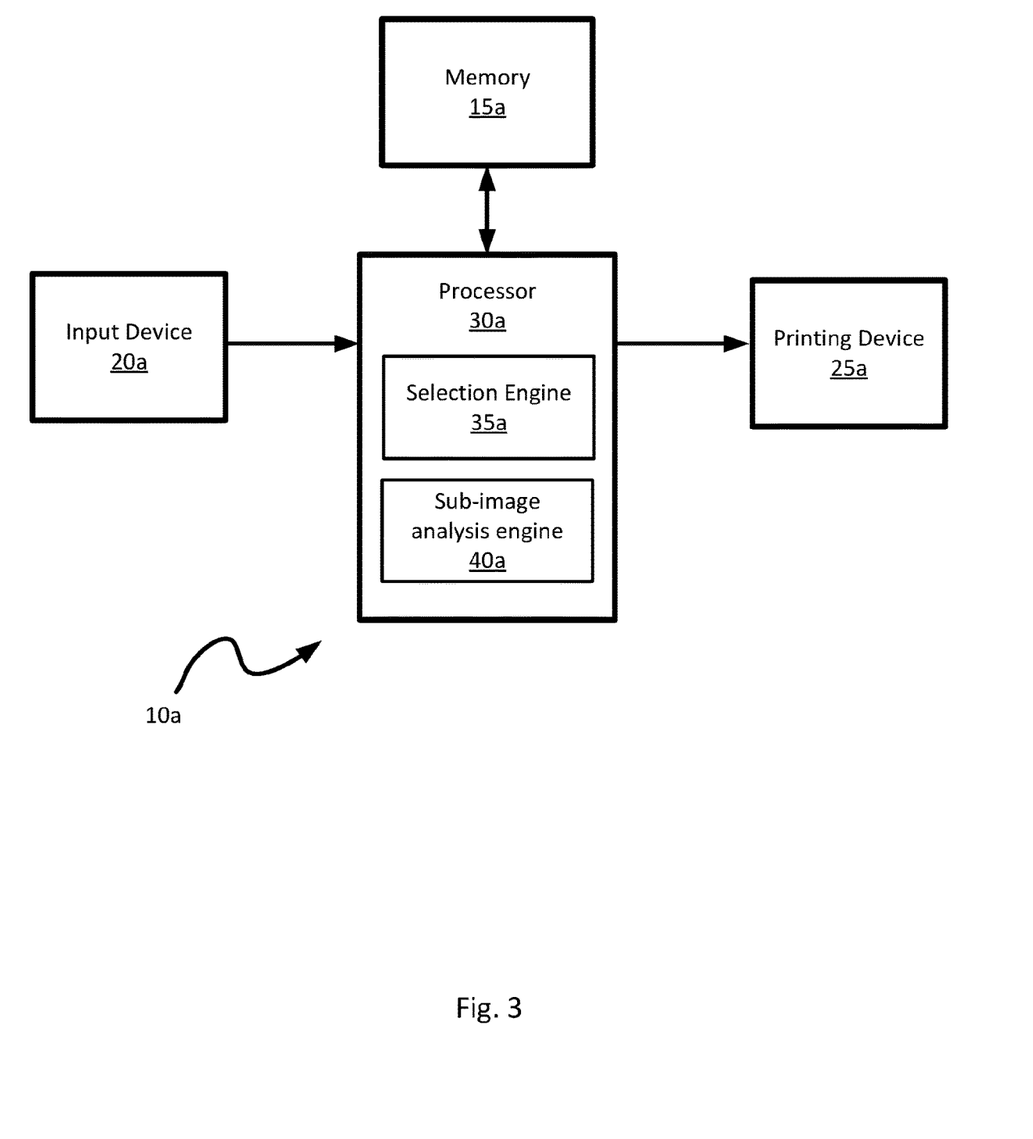
FIG. 3 is a block diagram of another example apparatus.

Referring to FIG. 3, another example of an apparatus for printing is shown at 10a. Like components of the apparatus 10a bear like reference to their counterparts in the apparatus 10, except followed by the suffix "a". The apparatus 10a includes a memory 15a, an input device 20a, a printing device 25a, and a processor 30a. The processor 30a may be to operate a selection engine 35a and a sub-image analysis engine 40a as well as carry out a set of instructions to adjust a print profile. Furthermore, the apparatus 10a is another example that may be used to carry out the method 200.

The memory 15a is coupled to the processor 30a and may include a non-transitory machine-readable storage medium that may be any electronic, magnetic, optical, or other physical storage device. In the present example, the memory 15a stores a plurality of print profiles in a database as well as print data. The print data may include data received to print from another computing device (not shown) as well as data that represents sample pages, such as a demonstration page to highlight the features of the printing device 25a. The memory 15a may also store executable instructions. In the present example, the executable instructions may include a set of iterative instructions. For example, the memory 15a may include a set of instructions to select a first print profile and a second print profile from the database with a plurality of print profiles, a set of instructions to generate print samples in accordance with the selected print profiles, a set of instructions to receive input to identify a preferred print sample by the user, and a set of instructions to select an additional print profile based on historical data such as prior selections of a preferred print sample by the user. These instructions may repeat in a loop such that each preferred print sample identified by the user in an iteration is added to the historical data to fine tune the print settings preferred by the user.

The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions to operate the printing device 25a or other hardware associated with the printing of documents. In addition, the machine-readable storage medium may also be encoded with data to store documents for printing, such as in a print queue.

The input device 20a is to receive input to identify a preferred print sample generated by the printing device 25a as discussed in greater detail below. The input device 20a is not particularly limited and may include a keyboard, a pointer device, a touch sensitive device, a button, a microphone, or any other device to generate signals upon activation.

The printing device 25a is not particularly limited and may include any device capable to generate an image or document on a sheet of paper, such as a print sample or a demonstration page. The printing device 25a may generate documents under various settings and conditions. For example, the processor 30a may use print profiles to determine various settings, such as a color setting, to generate multiple versions of a document, each with a slightly different appearance.

The printing device 25a may also include a print head or fluid ejection device which ejects drops of print fluid through a plurality of orifices or nozzles onto the sheet of paper. In an example, a print fluid supply may include a reservoir to store print fluid and to supply printing fluid to a print head, and the processor 30a may adjust fluid flow from the reservoir to the print head based on the data associated with the image as well as a given print profile. As another example, a printing device 25a may include a print bar and the processor 30a may adjust a temperature of the print bar (or other input energy variable) to generate the image and/or document.

The processor 30a may include a central processing unit (CPU), a microcontroller, a microprocessor, a processing core, a field-programmable gate array (FPGA), or similar. The processor 30a and memory 15a may cooperate to execute various instructions. In this example, the processor 30a also maintains and operates a selection engine 35a and a sub-image analysis engine 40a. In particular, the processor 30a may execute instructions stored on the memory 15a to implement the selection engine 35a and/or the sub-image analysis engine 40a. In other examples, the selection engine 35a and the sub-image analysis engine 40a may each be substituted with an external engine, such as from a software as a service provider.

The sub-image analysis engine 40a is to determine sub-images, or regions of sample page data to be printed via the printing device 25a. In the present example, sub-image analysis engine 40a may detect the presence of types of sub-images within the sample page data and divide the sample page data into regions with a sub-image type. For example, some types of sub-images include text, frequent images, and various tones from different types of images (e.g. skin tone, landscape image tones, such as earth tones or blue sky). It is to be appreciated that a preferred print profile for one of the sub-image types may not the same as a preferred print profile file for another sub-image type. Accordingly, different preferred print profiles may be established for each sub-image type via application of the method 200 and mapped onto the region of the sample page data where the sub-image type appears. Upon the determination of the preferred print profiles, a hybrid print profile for documents with multiple sub-image types may be generated by the processor 30a.

In the present example, the input device 20a may also provide a user interface to facilitate the collection of data from a user. In this example, the input device 20a may provide a user interface that identifies the sub-images and regions detected by the sub-image analysis engine 40a. Furthermore, the user interface may provide a user with the ability to verify the results from the sub-image analysis engine 40a and/or edit the results to custom define sub-images.

Figure 4:
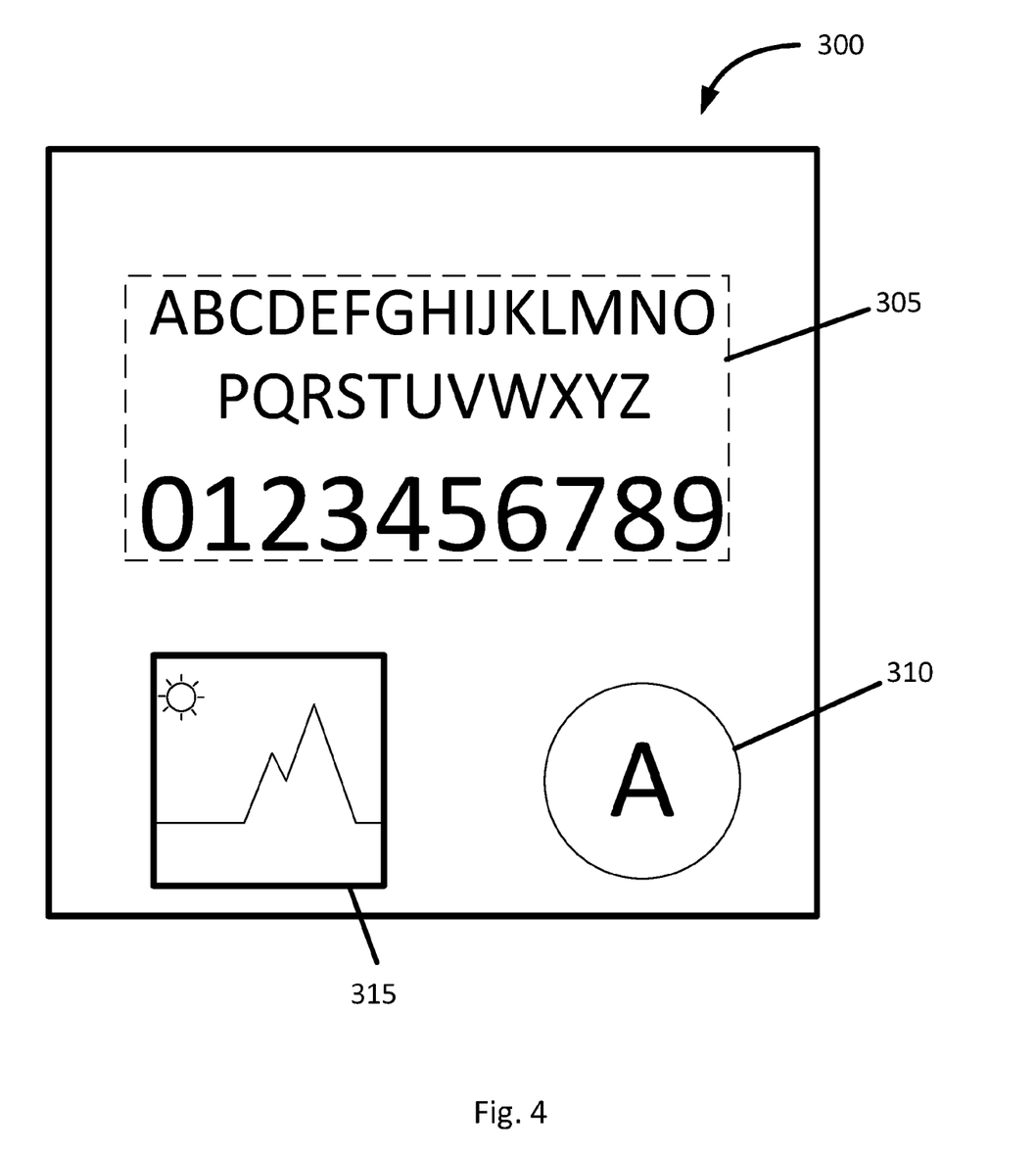
FIG. 4 is an example of a sample page.

FIG. 4 shows an example of a sample print page 300 with three sub-image types. The sample print page 300 includes a text sub-image 305, a frequent sub-image 310, and a picture sub-image 315.

The text sub-image 305 includes a sample of text for printing. The text is not particularly limited and the exact font, color, and size of the text may be varied. After execution of the method 200 on the sub-image 305, a preferred print profile may be determined to have print settings that accentuate the characters of the text by with a sharp contrast. In addition, the color settings may be set to have more discreet colors since text is typically one of a limited number of colors.

The frequent sub-image 310 includes a small image or logo that generally appears on multiple documents to be generated by the apparatus 10a. For example, the frequent sub-image 310 may be a company logo to print, such as on letterhead. Since such an image is likely to be standardized across multiple devices, the preferred print profile may be predetermined and set by an administrator such that is cannot be changed by a normal user. It is to be appreciated that by pre-setting the preferred print profile for the frequent sub-image 310, the frequent sub-image 310 may be more uniform across all printers at the company.

The picture sub-image 315 includes a picture, such as a photograph or other graphic. It is to be appreciated that this sub-image includes the greatest variation and that the preferred print profile established from the execution of the method 200 may be different based on the type of picture. For example, the picture sub-image 315 of a photograph of a landscape as shown in FIG. 4 may have a different preferred print profile from a portrait.

Accordingly, it is to be appreciated that once the sub-images have been properly defined, the sub-image analysis engine 40a may be used to detect the presence of each sub-image type in a document to print and apply the correct print profile for the portion of the page. Continuing with this example, the sub-image analysis engine 40a may detect for the presence of a frequent sub-image 310 and apply the appropriate print profile for that portion of the document no matter where the frequent sub-image appears on the page, which apply different print profiles for portions with text sub-images 305 and picture sub-images 315.

Figure 5:
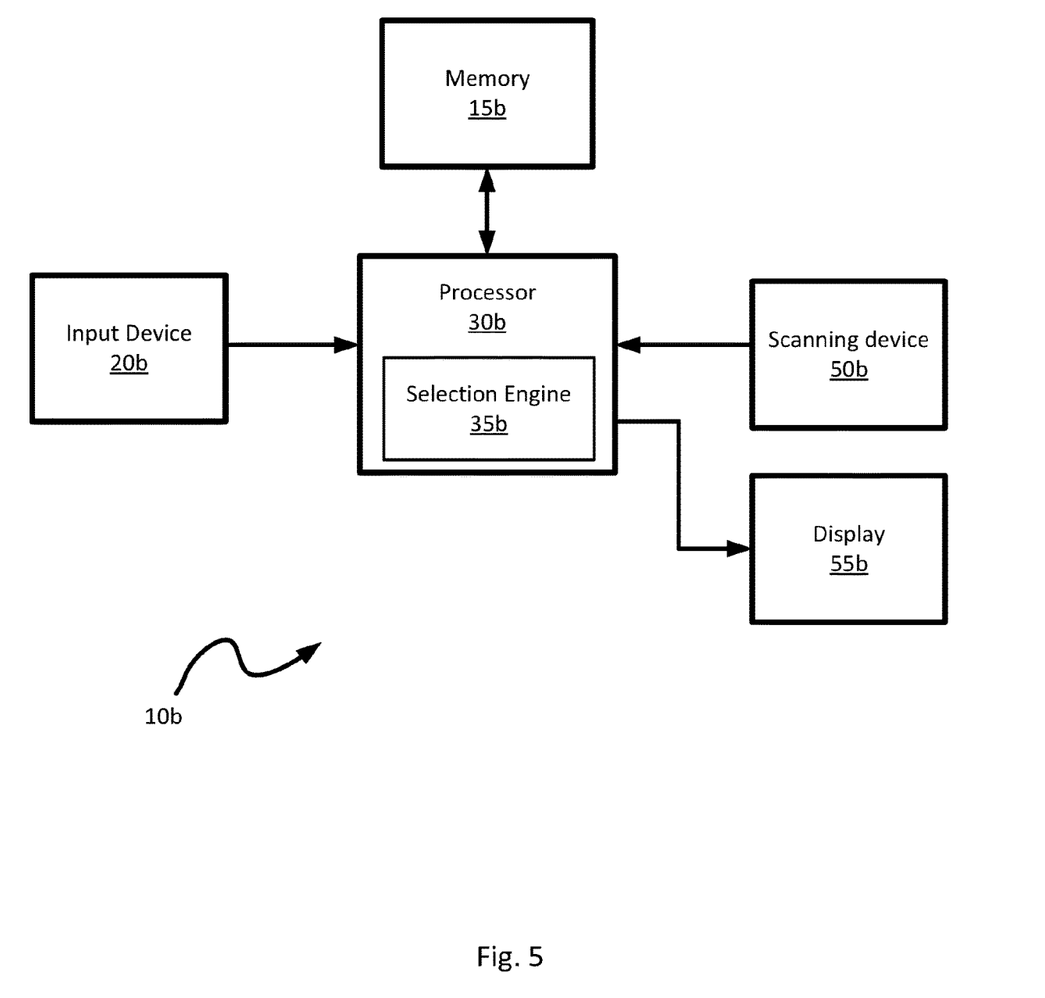
FIG. 5 is a block diagram of another example apparatus.

Referring to FIG. 5, an apparatus to scan documents is shown at 10b. Although documents scans provided by a scanner may be considered an opposite to the printing of documents, the determination of a preferred scan profile may be made with a method similar to that described above. In this regard, the apparatus 10b may share similar components with the apparatus 10. Like components of the apparatus 10b bear like reference to their counterparts in the apparatus 10, except followed by the suffix "b". The apparatus 10b includes a memory 15b, an input device 20b, a scanning device 50b, and a processor 30b. The processor 30b may be to operate a selection engine 35b as well as carry out a set of instructions to adjust a scan profile. Furthermore, the apparatus 10b is another example that may be used to carry out a modified version of the method 200.

The memory 15b is coupled to the processor 30b and may include a non-transitory machine-readable storage medium that may be any electronic, magnetic, optical, or other physical storage device. In the present example, the memory 15b stores a plurality of scan profiles in a database as well as scanned images. The scanned images are generated with a scan of a document or image using the scanning device 50b. The memory 15b may also store executable instructions. In the present example, the instructions may include a set of iterative instructions. For example, the memory 15b may include a set of instructions to select a first scan profile and a second scan profile from the database with a plurality of scan profiles, a set of instructions to generate scanned images in accordance with the selected scan profiles, a set of instructions to receive input to identify a preferred scanned sample by the user, and a set of instructions to select an additional scan profile based on historical data such as prior selections of a preferred scanned image by the user. These instructions may repeat in a loop such that each preferred scanned image identified by the user in an iteration is added to the historical data to fine tune the scanning settings preferred by the user.

The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions to operate the scanning device 50a or other hardware associated with the scanning documents. In addition, the machine-readable storage medium may also be encoded with data to store scanned images for subsequent retrieval.

The input device 20b is to receive input to identify a preferred scanned image generated by the scanning device 50b as view on the display 55b. The input device 20b is not particularly limited and may include a keyboard, a pointer device, a touch sensitive device, a button, a microphone, or any other device to generate signals upon activation. In particular, for examples where the display 55b is a touch screen display, the input device 20b and the display 55b may be the sample component.

The scanning device 50b is not particularly limited and may include any device capable to scan documents. The scanning device 50b may generate scanned images under various settings and conditions. For example, the processor 30b may use scan profiles to determine various settings, such as a color setting, to generate multiple versions of a document, each with a slightly different appearance.

The processor 30b may include a central processing unit (CPU), a microcontroller, a microprocessor, a processing core, a field-programmable gate array (FPGA), or similar. The processor 30b and memory 15b may cooperate to execute various instructions. In this example, the processor 30b also maintains and operates a selection engine 35b. In particular, the processor 30b may execute instructions stored on the memory 15b to implement the selection engine 35a. In other examples, the selection engine 35b may be substituted with an external engine, such as from a software as a service provider.

It should be recognized that features and aspects of the various examples provided above may be combined into further examples that also fall within the scope of the present disclosure.

What is claimed is:

1. An apparatus comprising:
a memory to store a plurality of print profiles and sample page data;
a selection engine to select a first print profile and a second print profile from the plurality of print profiles;
a printing device to generate a first print sample in accordance with the first print profile and to generate a second print sample in accordance with the second print profile, the first print sample and the second print sample based on the sample page data;
an input device to receive input, wherein the input identifies a preferred print sample selected from the first print sample and the second print sample; and
a processor coupled to the memory and the input device, wherein the processor is to, in response to receiving the input identifying the preferred print sample, direct the selection engine to select a third print profile from the plurality of print profiles, the third print profile based on the first print profile, the second print profile, and the input, wherein the third print profile is used by the printing device to generate a third print sample for comparison with the preferred print sample.

2. The apparatus of claim 1, wherein the first print profile and the second print profile differ by a first print setting selected from a plurality of print settings.

3. The apparatus of claim 2, wherein remaining print settings in the plurality of print settings of the first print profile and the second print profile are the same.

4. The apparatus of claim 3, wherein the third print profile differs by a second print setting selected from the plurality of print settings.

5. The apparatus of claim 1, wherein the processor is to identify an image type in the sample page data.

6. The apparatus of claim 1, wherein the processor is to divide the sample page data into a first region and a second region, wherein the first region includes a first image type and the second region includes a second image type, and wherein the first image type is different from the second image type.

7. The apparatus of claim 6, wherein the preferred print sample is associated with the first region.

8. A non-transitory machine-readable storage medium encoded with instructions executable by a processor, the non-transitory machine-readable storage medium comprising:
instructions to select a first print profile and a second print profile from a plurality of print profiles;
instructions to generate a first print sample in accordance with the first print profile and to generate a second print sample in accordance with the second print profile, the first print sample and the second print sample based on sample page data;
instructions to receive input, wherein the input identifies a preferred print sample selected from the first print sample and the second print sample; and
instructions to, in response to receiving the input identifying the preferred print sample, select a third print profile from the plurality of print profiles based on historical data.

9. The non-transitory machine-readable storage medium of claim 8, wherein the first print profile and the second print profile differ by a first print setting selected from a plurality of print settings.

10. The non-transitory machine-readable storage medium of claim 9, wherein remaining print settings in the plurality of print settings of the first print profile and the second print profile are the same.

11. The non-transitory machine-readable storage medium of claim 10, wherein the third print profile differs by a second print setting selected from the plurality of print settings.

12. A method comprising:
selecting a first print profile and a second print profile from a plurality of print profiles;
generating a first print sample in accordance with the first print profile, the first print sample based on sample page data;
generating a second print sample in accordance with the second print profile, the second print sample based on the sample page data;
receiving input from a user via an input device, wherein the input identifies a preferred print sample selected from the first print sample and the second print sample; and
selecting, iteratively in response to receiving the input identifying the preferred print sample, additional print profiles from the plurality of print profiles for psychometric testing to establish a preferred print profile.

13. The method of claim 12, wherein the first print profile and the second print profile differ by a first print setting selected from a plurality of print settings.

14. The method of claim 13, wherein remaining print settings in the plurality of print settings of the first print profile and the second print profile are the same.

15. The method of claim 14, wherein the additional print profiles differ by additional print settings selected from the plurality of print settings.

* * * * *